(12) United States Patent
Evrard et al.

(10) Patent No.: US 7,434,007 B2
(45) Date of Patent: Oct. 7, 2008

(54) MANAGEMENT OF CACHE MEMORIES IN A DATA PROCESSING APPARATUS

(75) Inventors: Christophe Philippe Evrard, Le Tignet (FR); Cédric Denis Robert Airaud, Saint Laurent du Var (FR); Philippe Jean-Pierre Raphalen, Valbonne (FR)

(73) Assignee: ARM Limited, Cambridge (GB)

( * ) Notice: Subject to any disclaimer, the term of this patent is extended or adjusted under 35 U.S.C. 154(b) by 378 days.

(21) Appl. No.: 11/091,929

(22) Filed: Mar. 29, 2005

(65) Prior Publication Data

US 2006/0224829 A1 Oct. 5, 2006

(51) Int. Cl.
*G06F 12/00* (2006.01)

(52) U.S. Cl. ...................................... 711/144; 711/122
(58) Field of Classification Search .................. 711/144
See application file for complete search history.

(56) References Cited

U.S. PATENT DOCUMENTS

| | | | | |
|---|---|---|---|---|
| 6,725,337 | B1 * | 4/2004 | Tan et al. | 711/133 |
| 2004/0260879 | A1 * | 12/2004 | Barroso et al. | 711/122 |
| 2005/0027946 | A1 * | 2/2005 | Desai | 711/146 |

OTHER PUBLICATIONS

Y. Zheng et al., "Performance Evaluation of Exclusive Cache Hierarchies", IEEE International Symposium on Performance Analysis of Systems and Software (ISPASS04), Mar. 2004, pp. 89-96.

* cited by examiner

*Primary Examiner*—Matt Kim
*Assistant Examiner*—Ryan Dare
(74) *Attorney, Agent, or Firm*—Nixon & Vanderhye P.C.

(57) ABSTRACT

The present invention provides a data processing apparatus and method for managing cache memories. The data processing apparatus comprises a processing unit for issuing an access request seeking access to a data value, and a hierarchy of cache memories for storing data values for access by the processing unit. The hierarchy of cache memories comprises at least an n-th level cache memory and n+1-th level cache memory which at least in part employ exclusive behavior with respect to each other. Each cache memory comprises a plurality of cache lines, at least one dirty value being associated with each cache line, and each dirty value being settable to indicate that at least one data value held in the associated cache line is more up-to-date than a corresponding data value stored in a main memory. When employing exclusive behavior, the n-th level cache memory is operable, on eviction of a cache line from the n-th level cache memory to the n+1-th level cache memory, to additionally pass an indication of the at least one associated dirty value from the n-th level cache memory to the n+1-th level cache memory. This has been found to reduce the frequency of evictions of lines from the n+1-th level cache memory when employing exclusive behaviour.

10 Claims, 7 Drawing Sheets

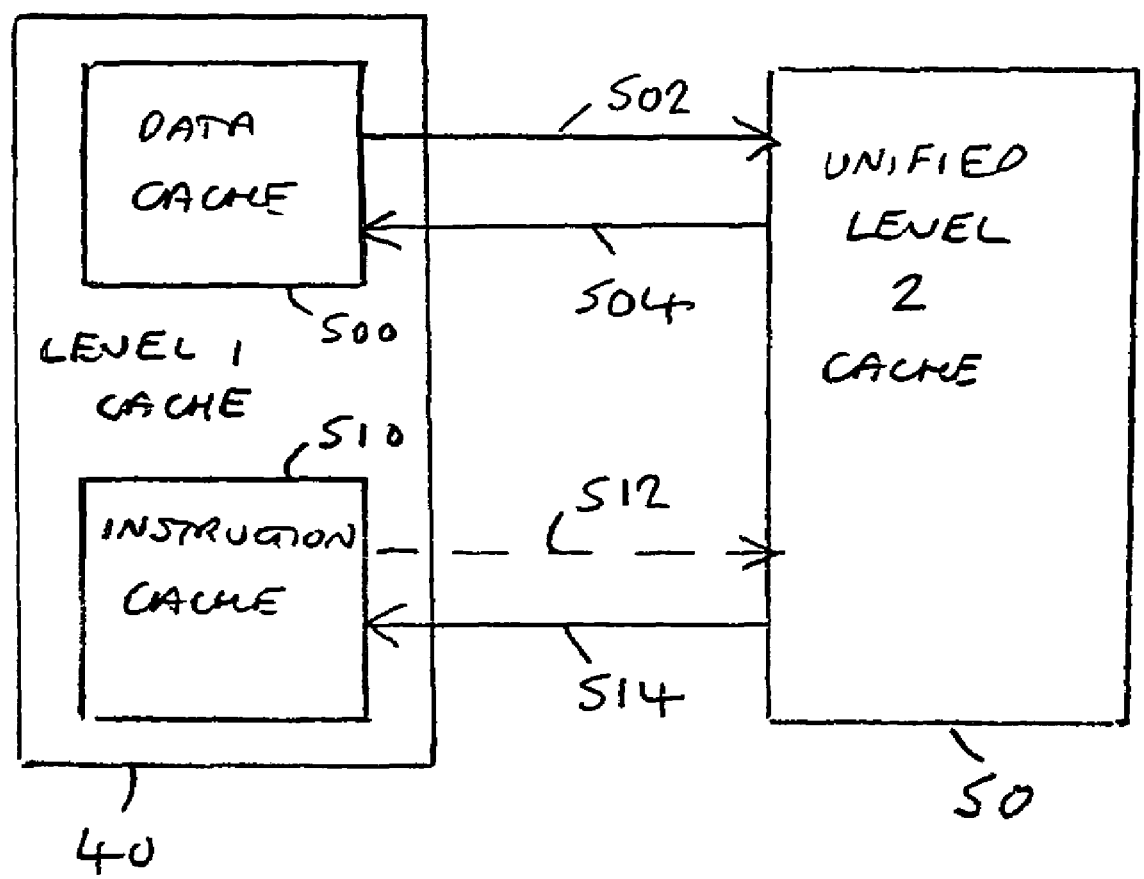
FIG_6

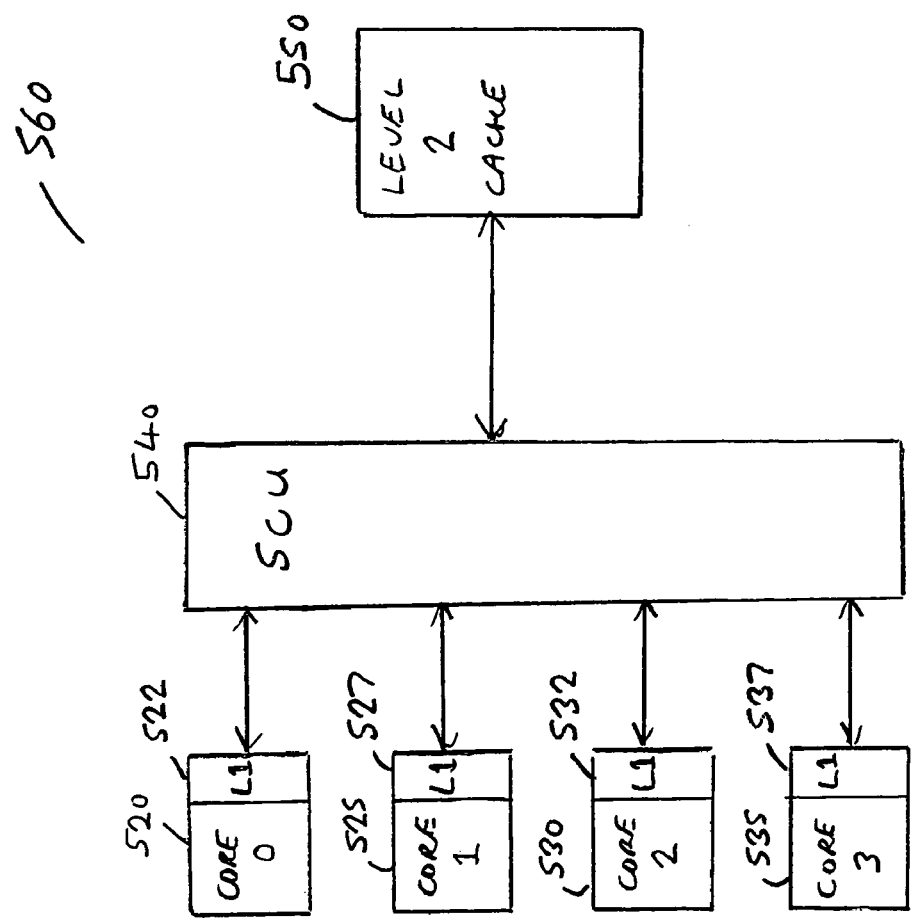

MANAGEMENT OF CACHE MEMORIES IN A DATA PROCESSING APPARATUS

BACKGROUND OF THE INVENTION

1. Field of the Invention

The present invention relates to techniques for management of cache memories (also referred to herein as caches) in a data processing apparatus, and in particular to techniques for managing a hierarchy of caches in which at least two levels of cache at least in part exhibit exclusive behaviour with respect to each other.

2. Description of the Prior Art

A cache may be arranged to store data and/or instructions fetched from a memory so that they are subsequently readily accessible by a processor. Hereafter, unless otherwise apparent from the context, the term "data value" will be used to refer to both instructions and data. The cache will store the data value until it is overwritten by a data value for a new location required by the processor. The data value is stored in cache using either physical or virtual memory locations. Should the data value in the cache have been altered then it is usual to ensure that the altered data value is re-written to the memory, either at the time the data is altered or when the data value in the cache is overwritten.

As the size of a cache increases, the rate of achieving a cache hit within the cache increases. However, the larger the cache, the slower the cache will become. Another way to increase cache hit rate is to more effectively use the existing cache area. With this in mind, many modern designs use a hierarchy of caches, which allows a trade-off between optimising the hit time and miss rate. Different levels of cache within the hierarchy can be arranged to be either inclusive or exclusive. For example, considering a level one cache and a level two cache, an inclusive cache system implies that the contents of the level one cache are a subset of the contents of the level two cache. In contrast, an exclusive cache system is one in which the contents of the level one cache and level two cache are generally exclusive. By using an exclusive cache system, the effective cache size can be increased relative to an inclusive cache system, but typically the management of exclusive caches is more complex.

The article entitled "Performance Evaluation of Exclusive Cache Hierarchies" by Ying Zheng et al, IEEE International Symposium on Performance Analysis of Systems and Software (ISPASS04), Mar. 10-12, 2004, pages 89-96 provides a discussion of exclusive caching and inclusive caching systems.

Typically, more evictions of cache lines from the caches occur when employing an exclusive cache system rather than an inclusive cache system. This has an adverse effect on performance, particularly when certain of those evictions require data values to be evicted to main memory.

Accordingly, it would be desirable to provide a technique which enables the effective cache size increase resulting from use of exclusive caching systems to be realised, whilst reducing the number of evictions taking place when employing such an exclusive caching system.

SUMMARY OF THE INVENTION

Viewed from a first aspect, the present invention provides a data processing apparatus comprising: a processing unit operable to issue an access request seeking access to a data value; a hierarchy of cache memories operable to store data values for access by the processing unit, the hierarchy of cache memories comprising at least an n-th level cache memory and an n+1-th level cache memory which at least in part employ exclusive behaviour with respect to each other; each cache memory comprising a plurality of cache lines, at least one dirty value being associated with each cache line, each dirty value being settable to indicate that at least one data value held in the associated cache line is more up-to-date than a corresponding data value stored in a main memory; when employing exclusive behaviour the n-th level cache memory being operable, on eviction of a cache line from the n-th level cache memory to the n+1-th level cache memory, to additionally pass an indication of the at least one associated dirty value from the n-th level cache memory to the n+1-th level cache memory.

In accordance with the present invention, a data processing apparatus has a hierarchy of cache memories in which at least an n-th level cache memory and an n+1-th level cache memory at least in part operate exclusively with respect to each other. These cache memories may hence be arranged to always employ exclusive behaviour with respect to each other, or alternatively may employ exclusive behaviour for some accesses but not for others.

In accordance with the present invention, when employing exclusive behaviour, the n-th level cache memory is operable on eviction of a cache line to the n+1-th level cache memory, to additionally pass an indication of any associated dirty value from the n-th level cache memory to the n+1-th level cache memory. Typically the evicted cache line will then be stored within the n+1-th level cache memory, and by exporting an indication of any associated dirty value, this means that if the cache line being evicted was not dirty in n-th level cache memory, then it can be allocated as non-dirty in the n+1-th level cache memory. This contrasts with normal exclusive behaviour, where any such evicted cache line is always marked as dirty within the n+1-th level cache memory.

By taking such an approach, an advantage is realised when the n-th level cache memory issues a request to the n+1-th level cache memory for a data value which may or may not be contained within the n+1-th level cache memory, this causing a linefill process to be performed with respect to the n-th level cache memory. When the cache line the subject of the linefill process is present in the n+1-th level cache memory and is returned to the n-th level cache memory, the n+1-th level cache memory will need to clean that cache line, assuming it is employing exclusive behaviour. The cleaning process will involve invalidating that cache line within the n+1-th level cache memory, and if the line is dirty performing an eviction of that cache line to the n+2-th level cache memory, or to main memory if the n+1-th level cache memory is the final level of cache memory. Such an eviction will introduce a latency which may stall the system. This latency is particularly long in situations where the eviction is taking place to main memory.

However, by exporting an indication of any associated dirty value from the n-th level cache memory to the n+1-th level cache memory when the line was originally evicted from the n-th level cache memory, this ensures that the cache line will only be marked as dirty within the n+1-th level cache memory if in fact that cache line had been modified whilst in the n-th level cache memory. Accordingly, such an approach has been found to significantly reduce the occurrence of evictions from the n+1-th level cache memory in situations where cache lines are being returned to the n-th level cache memory as part of a linefill process.

In accordance with the present invention, at least one dirty value is associated with each cache line. Hence, in one embodiment, a single dirty value can be provided for the entire cache line which is set when any data value within that cache line is more up to date than a corresponding data value stored in the main memory. In alternative embodiments, more than one dirty value may be associated with each cache line, such that each dirty value relates to a subset of the data values within that cache line. In such an embodiment, it may typically be appropriate to evict the fall cache line when employing exclusive behaviour, and to output all dirty values (or a combination of those dirty values) as part of the eviction process. In contrast, when employing non-exclusive behaviour, only the subset of data values that is dirty will typically be evicted. In a further embodiment, dirty values may be shared between multiple cache lines, although in such an embodiment it may typically be appropriate to evict those multiple cache lines as part of a single eviction process.

The indication of the at least one associated dirty value which is passed from the n-th level to the n+1-th level cache memory may comprise the at least one associated dirty value itself, or alternatively can comprise any other information which would indicate the dirty/clean status as indicated by the at least one associated dirty value. Hence, in one example, if more than one dirty value is associated with a particular cache line, it may be sufficient to provide a value corresponding to a logical OR operation performed on those various dirty values, such that a dirty status is indicated if any of those dirty values are set.

In one embodiment, the data processing apparatus is further arranged such that when employing exclusive behaviour the n+1-th level cache memory is operable, on performing a linefill operation from the n+1-th level cache memory to the n-th level cache memory, to additionally pass an indication of the at least one associated dirty value from the n+1-th level cache memory to the n-th level cache memory. By taking such an approach, it can be ensured that when a cache line is stored within the n-th level cache memory, it is allocated the same dirty/clean status as it had in the n+1-th level cache memory. Accordingly, to maintain exclusive behaviour, it is only then necessary for the n+1-th level cache memory to invalidate the line that it has passed to the n-th level cache memory, and in particular there is no longer a need to evict that cache line from the n+1-th level cache memory to the n+2-th level cache memory, or to main memory, even if that cache line is dirty. This hence achieves a further reduction in the number of evictions occurring within the hierarchy of cache memories when employing exclusive behaviour between the n-th level and the n+1-th level cache memories.

The n-th level cache memory and n+1-th level cache memory may be any suitable pair of cache memories within the hierarchy. However, in one embodiment, the n-th level cache memory is a level 1 cache memory and the n+1-th level cache memory is a level 2 cache memory. As will be appreciated by those skilled in the art, the level one cache memory is the first level within the hierarchy to be accessed when an access request is issued from the processing unit.

The processing unit may take a variety of forms, for example a Direct Memory Access (DMA) engine, a Digital Signal Processor (DSP), a processor core, etc. In one particular embodiment, the processing unit is a processor core. The data processing apparatus may be part of a complex system, for example where the n-th and n+1-th level cache memories may be two levels of cache within a memory controller (typically an SDRAM or Flash memory controller), and hence may be accessed as a slave from any appropriate bus. In such cases, the processing unit may be any master device in the system that is able to issue access requests to the memory controller.

Whilst the data processing apparatus may be a uni-processor apparatus with a single processor core, it is also possible for a data processing apparatus in accordance with alternative embodiments of the present invention to provide multiple processor cores. One example of such a data processing system is a Symmetric Multi-Processing (SMP) system in which multiple processor cores share at least some memory resources. In one such embodiment, said processing unit comprises a plurality of processors, and said level 1 cache memory comprises a plurality of caches, each cache being associated with one of said plurality of processors. The level two cache memory may also comprise a plurality of caches. However, in one embodiment, the level two cache memory is shared between the plurality of processors, and exclusive behaviour is employed at least in part between the level two cache memory and the plurality of caches forming the level one cache memory.

As mentioned earlier, it is not a requirement for exclusive behaviour to be employed between the n-th level cache memory and the n+1-th level cache memory in all situations. In one particular embodiment, the n-th level cache memory and the n+1-th level cache memory are operable to selectively employ inclusive behaviour or said exclusive behaviour dependent on one or more control parameters. The control parameters may take a variety of forms. In one embodiment, such control parameters may be contained within the access request itself. For example, if the access request relates to a request for data, exclusive behaviour may be employed, whilst if the access request relates to access to an instruction, inclusive behaviour may be employed. In addition, a finer granularity of selectiveness may be employed such that, for example, exclusive behaviour will be employed if the access relates to a write back region of memory, and both read allocate and write allocate caching is applied. If instead the access relates to a write back region of memory, but caching is only used on read allocate but not write allocate, then in one embodiment inclusive behaviour may be employed.

Another way in which the control parameters may be specified is via specification of an address range to which exclusive or inclusive behaviour applies.

Further, instead of specifying the control parameters in the request, they may be set in a control register provided by the apparatus.

In one embodiment, the n-th level cache memory and the n+1-th level cache memory comprise data cache memories. In one particular embodiment, the data processing apparatus further comprises an n-th level instruction cache memory and an n+1-th level instruction cache memory which employ inclusive behaviour with respect to each other. The data cache memories and instruction cache memories at each level may be entirely separate, or may be unified. In one particular embodiment, the data cache memory and instruction cache memory at the n-th level are separate, but the data cache memory and the instruction cache memory are unified at the n+1-th level. In one such embodiment, the n+1-th level of cache memory can be arranged to adopt exclusive behaviour for certain data accesses, but always employ inclusive behaviour for instruction accesses.

Further, if separate ports are provided at the n+1-th level cache memory for performing linefills to the n-th level data cache and linefills to the n-th level instruction cache, it would be possible to arrange the n+1-th level cache memory such that on performing a linefill operation to the n-th level data cache memory, the associated dirty value is additionally passed from the n+1-th level cache memory to the n-th level data cache memory, thereby only requiring invalidation of the cache line at the n+1-th level, whilst for a linefill to the n-th level instruction cache memory, no such dirty value is passed and instead a full clean and invalidate process is performed at the n+1-th level.

Viewed from a second aspect, the present invention provides a data processing apparatus comprising: processing means for issuing an access request seeking access to a data value; a hierarchy of cache memory means for storing data values for access by the processing unit, the hierarchy of cache memory means comprising at least an n-th level cache memory means and an n+1-th level cache memory means which at least in part employ exclusive behaviour with respect to each other; each cache memory means comprising a plurality of cache lines, at least one dirty value being associated with each cache line, each dirty value being settable to indicate that at least one data value held in the associated cache line is more up-to-date than a corresponding data value stored in a main memory; when employing exclusive behaviour the n-th level cache memory being arranged, on eviction of a cache line from the n-th level cache memory to the n+1-th level cache memory, to additionally pass an indication of the at least one associated dirty value from the n-th level cache memory to the n+1-th level cache memory.

Viewed from a third aspect, the present invention provides a method of managing cache memories in a data processing apparatus, the data processing apparatus having a processing unit for issuing an access request seeking access to a data value, and a hierarchy of cache memories for storing data values for access by the processing unit, each cache memory in the hierarchy comprising a plurality of cache lines, at least one dirty value being associated with each cache line, each dirty value being settable to indicate that at least one data value held in the associated cache line is more up-to-date than a corresponding data value stored in a main memory, the method comprising the steps of: arranging the hierarchy of cache memories such that at least an n-th level cache memory and an n+1-th level cache memory at least in part employ exclusive behaviour with respect to each other; when employing exclusive behaviour causing the n-th level cache memory, on eviction of a cache line from the n-th level cache memory to the n+1-th level cache memory, to additionally pass an indication of the at least one associated dirty value from the n-th level cache memory to the n+1-th level cache memory.

BRIEF DESCRIPTION OF THE DRAWINGS

The present invention will be described further, by way of example only, with reference to embodiments thereof as illustrated in the accompanying drawings, in which:

FIG. 6 is a diagram illustrating one embodiment of the level one cache and level two cache of FIG. 1; and FIG. 7 is a diagram of a data processing apparatus in accordance with a second embodiment of the present invention.

DESCRIPTION OF EMBODIMENTS

Figure 1:
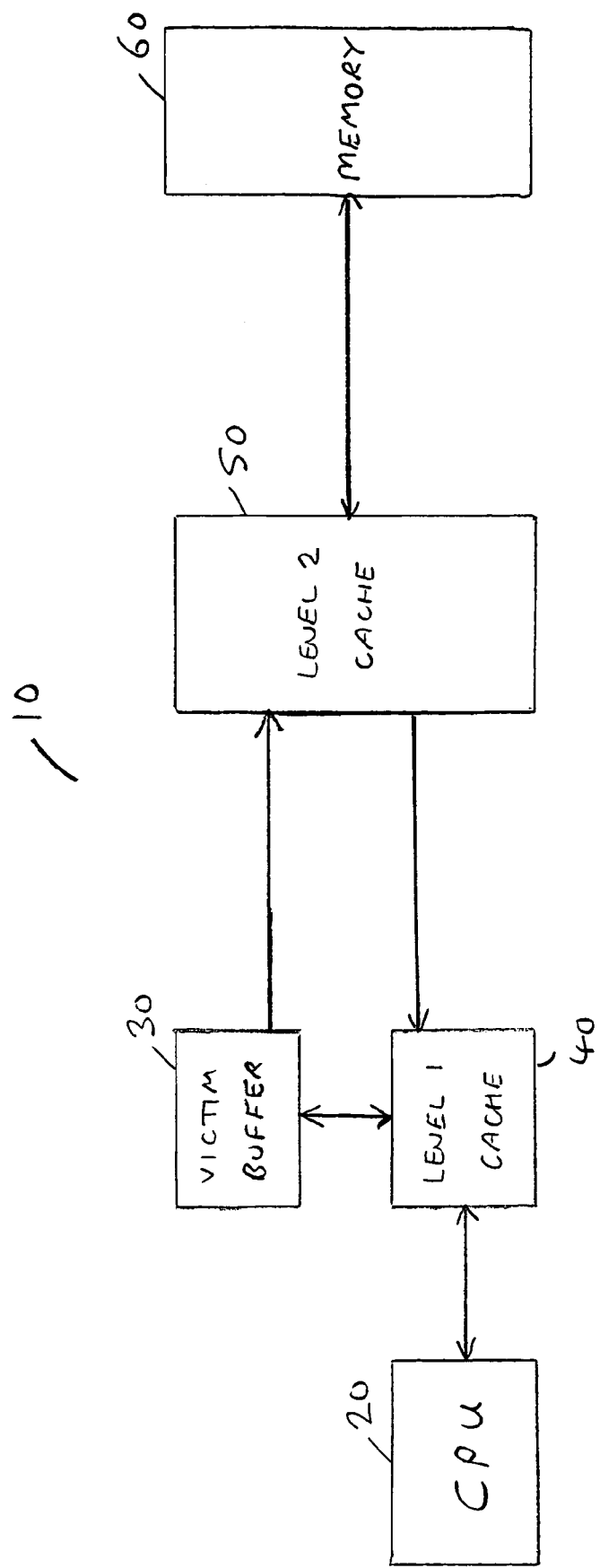
FIG. 1 is a block diagram of a data processing apparatus in accordance with one embodiment of the present invention.

FIG. 1 is a block diagram of a data processing apparatus in accordance with one embodiment of the present invention. In accordance with this embodiment, a processing unit, more particularly in this example a central processing unit (CPU) 20, is provided for carrying out data processing operations. A memory 60 is provided for storing data values for access by the CPU 20 during the performance of such data processing operations. Such data values may be instructions for execution by the CPU 20, or data processed during execution of those instructions.

A hierarchy of cache memory is provided between the CPU 20 and the memory 60 with the aim of improving speed of access to data values by the CPU 20. Cache memories are small, high-speed buffer memories, which are typically arranged to contain the most recently used portions of main memory 60. Typically, as the cache size is increased, the rate of achieving a cache hit within the cache increases, hence improving the speed benefit. However, the larger the cache, the slower the operation of the cache will become. In accordance with the embodiment of FIG. 1, a two-level cache hierarchy is employed which allows a trade off between optimising hit time and miss rate. Typically, although this is not a requirement, the level one cache 40 is smaller than the level two cache 50.

When an access request is issued by the CPU 20, a look up is first performed within the level one cache 40 to determine whether the data value to be accessed is present within that level one cache 40. If so, the data value is accessed within the level one cache, and hence for a write access the accessed data value can be updated within the level one cache, whilst for a read access the required data value can be returned to the CPU 20 from the level one cache 40.

In the event of a miss within the level one cache 40, then the access request is propagated on to the level two cache 50 to determine whether the data value to be accessed is stored within the level two cache 50. If so, then that data value is returned via the level one cache 40 to the CPU 20, whereas if not the access request is propagated to any further level of caching, or in the example illustrated in FIG. 1 is propagated directly to main memory 60 to cause the data value to be accessed in main memory.

In FIG. 1, the paths illustrated between the CPU 20, the various levels of cache 40, 50, and the main memory 60 are those paths appropriate for access requests that are cacheable at both levels of cache. As will be appreciated by those skilled in the art, certain access requests can also be specified as being non-cacheable, in which event those access requests will be propagated directly from the CPU 20 to the main memory 60. Also, it will be appreciated that certain access requests can be specified as being cacheable at certain cache levels and not others, and hence for example an access request that is non-cacheable at level one but cacheable at level two will be routed directly from CPU 20 to cache 50 (this line being omitted from FIG. 1 for clarity).

Considering cacheable access requests, then various allocation policies can be adopted for determining at what point data values are cached within one of the levels 40, 50 of the hierarchy of cache memories. In particular, a write allocate policy will cause a data value to be allocated into cache memory when a write access request is issued by the CPU 20 relating to that data value. Hence, if that write access request specifies a data value which is not already stored within one of the levels of the cache memory, then that data value will be retrieved from the next level of memory (which for a cache miss in the level one cache 40 will be the level two cache 50, and for a cache miss in the level two cache 50 will be the memory 60) and allocated into that level of cache, whereafter the write update will take place on that data value as stored within that level of the cache. Typically, when performing such a procedure, the data value will be allocated only into the level one cache 40 at that time if employing exclusive behaviour, but will be allocated into both the level one 40 and the level two 50 caches if employing inclusive behaviour.

An alternative approach for performing the write update is to perform the update at the level of memory currently holding the data value, and then to allocate the data value into the level of memory that produced the cache miss.

Similarly, a read allocate policy can be employed where data values are allocated into the cache memory when performing a read access request, and accordingly if the read access request specifies a data value which is not currently stored within one of the levels of the cache hierarchy, then that data value is accessed from the next level of memory (which for a cache miss in the level one cache 40 will be the level two cache 50, and for a cache miss in the level two cache 50 will be the main memory 60), and in addition to being returned to the CPU 20 is also at that time allocated within one of the levels of the cache hierarchy. Typically, when performing such a procedure, the data value will be allocated only into the level one cache 40 at that time if employing exclusive behaviour, but will be allocated into both the level one 40 and the level two 50 caches if employing inclusive behaviour.

When a cache miss occurs in the level one cache 40, then typically a victim cache line will be identified for eviction from the level one cache, so as to make space available for any new cache line to be allocated as part of a linefill process to the level one cache 40. This victim cache line will typically be passed from the level one cache 40 to the victim buffer 30, which will then communicate with the level two cache 50 to cause that victim cache line to be evicted to the level two cache. Through the use of such a victim buffer 30, the fall eviction process does not need to have been performed before a linefill process can be initiated from the level two cache 50 to the level one cache 40, thereby increasing the speed with which data is made available to the CPU 20 from the cache hierarchy.

The evicted cache line will be passed from the victim buffer 30 to the level 2 cache as a write access specifying the cache line data. When employing exclusive behaviour, this will produce a miss in the level 2 cache. In case of a cache miss at a particular level of cache, the normal behaviour is to request a linefill from the next level of memory and then to merge the retrieved cache line with the write data to make sure that the full updated cache line is available within that particular level of cache. However, if the full cache line is already specified in the write access, then the above linefill procedure can be avoided. In the above embodiment, this approach can be used to good effect when handling the evictions from level 1 to level 2 cache, as the level 2 cache 50 can then allocate the entire cache line evicted from level 1 cache 40 without performing a linefill from memory 60, thereby improving the speed of the operation.

The victim buffer 30 may be arranged in a variety of ways. In one embodiment, the victim buffer 30 is arranged to flush its data to the level two cache 50 as soon as the bus is idle. If in the meantime an access request is issued seeking access to a data value that has been passed from the level one cache 40 to the victim buffer 30, then the victim buffer 30 can be arranged to return the cache line containing that data value to the level one cache 40 without flushing it to the level two cache 50. To implement this functionality, it is necessary upon a cache miss in the level one cache 40 to check whether the required data value is stored within the victim buffer 30 prior to issuing any linefill request to the level two cache 50.

Instead of a victim buffer 30, a victim cache can be employed. In contrast to a victim buffer, a victim cache typically maintains the data held therein in the hope that the data is reused soon, and only evicts that data to level two cache 50 when necessary, for example to make space for a new cache line being evicted from the level one cache 40.

Figure 2:
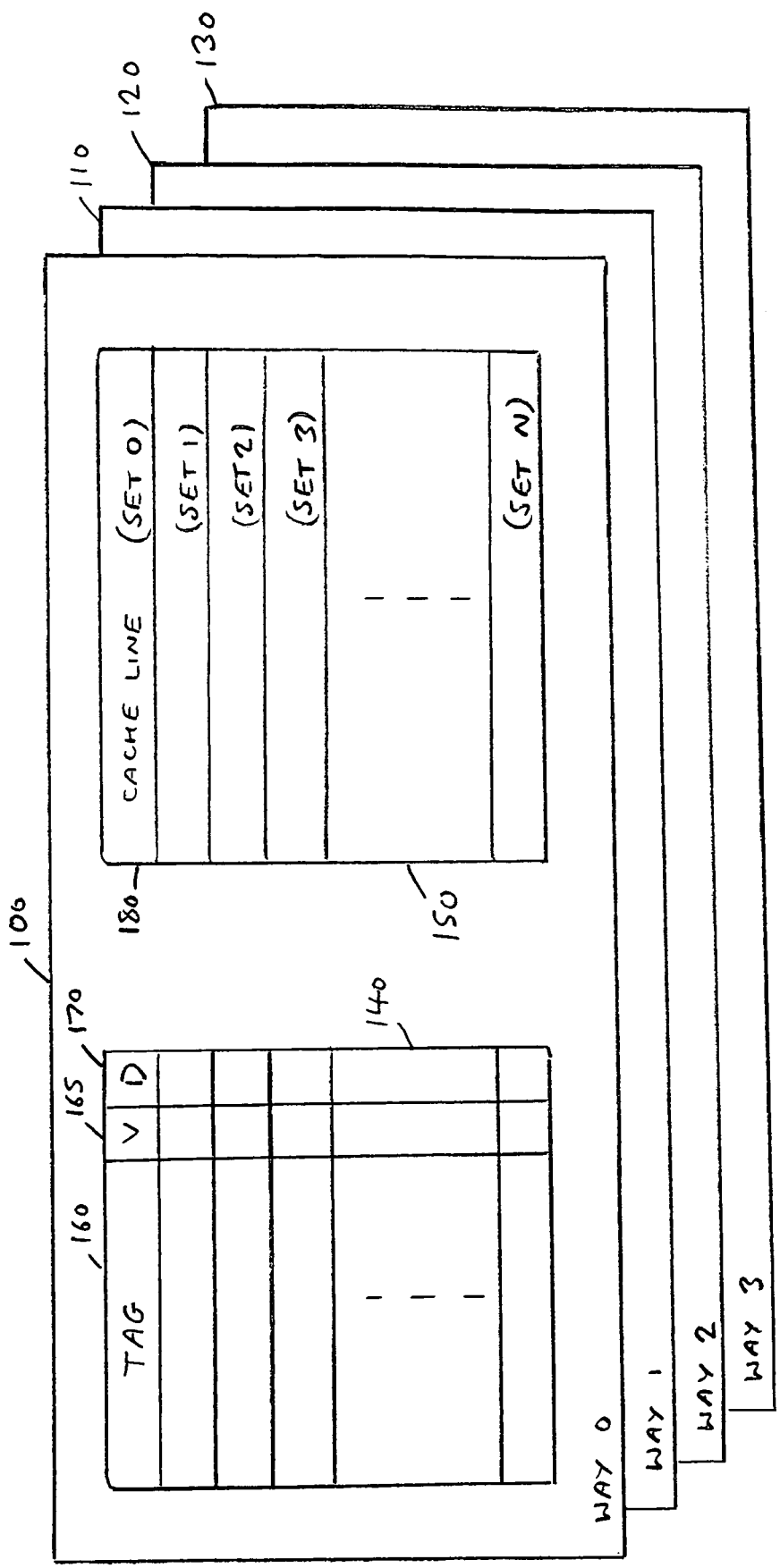
FIG. 2 is a diagram schematically illustrating the construction of a set associative cache in accordance with one embodiment.

FIG. 2 is a diagram illustrating the structure of a four way set associative cache that may for example be used as the level one cache 40 of FIG. 1. Such a cache may also be used to implement the level two cache 50, although in one particular embodiment the level two cache 50 is implemented by an eight way set associative cache. Each of the four ways 100, 110, 120 and 130 of the cache includes a TAG memory 140 (also referred to herein as a TAG RAM) and a data memory 150. For each cache line 180 within the data memory 150, there is provided a corresponding entry within the TAG memory 140. The number of data values stored within each cache line can be varied dependent on the implementation, but in one example each cache line stores eight 32-bit words.

The TAG RAM may be formed of one or more memory blocks, and hence may be divided amongst several physical memories, for example one per way.

Each access request issued by the CPU 20 for access to a data value will typically identify an address associated with that data value, and the address will consist of a TAG portion, a set portion and word and byte portions. The set portion of the address is used to identify a particular set within a cache. As can be seen from FIG. 2, each set consists of a single cache line in each of the ways, and hence for a four way set associative cache there are four cache lines in each set. This means that for a particular data value, there are four possible cache line locations in which that data value can be stored within a four way set associative cache, namely one cache line in each way.

The data values stored within any particular cache line will share a common TAG portion of their address, and that TAG portion is stored within the TAG field 160 of the associated entry of the TAG memory 140. Also stored within the associated entry of the TAG memory 140 (or alternatively in a separate memory to the TAG memory 140) are two further fields, namely a valid field 165 and a dirty field 170. Each of these fields typically comprises a single bit. The valid bit 165 is used to indicate whether a data value stored in the corresponding cache line is still considered valid or not. Hence, setting the valid bit 165 will indicate that the corresponding data values of the associated cache line are valid, whilst resetting the valid bit will indicate that the cache line is no longer valid. Similarly, the dirty bit 170 is used to indicate whether any of the data values stored in the corresponding cache line are more up-to-date than the version of those data values as stored in main memory 60.

The value of the dirty bit 170 is relevant for write back regions of memory 60, where a data value output by the processor core 20 and stored in the cache hierarchy 40, 50 is not immediately also passed to the main memory 60 for storage, but rather the decision as to whether that data value should be passed to main memory 60 is taken at the time that the particular cache line containing that data value is overwritten, or "cleaned", from the cache hierarchy. Accordingly, a dirty bit 170 which is not set will indicate that the data values stored in the corresponding cache line correspond to the data values stored in main memory 60, whilst the dirty bit 170 being set will indicate that at least one of the data values stored in the corresponding cache line has been updated, and the updated data value has not yet been passed to the main memory 60.

In accordance with embodiments of the present invention, the level one cache 40 and the level two cache 50 are arranged so that, for at least some accesses, they employ exclusive behaviour with respect to each other. Hence, to the extent that they operate in such an exclusive manner, the contents of the level one cache 40 and the level two cache 50 are exclusive. This enables the effective cache size to be increased relative to an inclusive cache system, but can lead to an increase in the number of evictions to main memory 60, when compared with a similar cache hierarchy employing inclusive behaviour (i.e. where the data values stored in the level one cache 40 are a subset of the data values stored in the level two cache 50). This can be illustrated by the following example behaviour of a typical exclusive cache system.

If a cache miss occurs in the level one cache 40, then this will typically cause a cache line to be evicted from the level one cache for storage in the level two cache 50, and when that cache line is written into the level two cache, it will typically be marked as dirty. If whilst that cache line of data is still present in the level two cache 50, an access request is issued by the CPU 20 for access to a data value within that cache line, this will cause a miss within the level one cache 40, and thereby result in a linefill request being issued to the level two cache 50. Due to the exclusive nature of the two caches, this will cause the cache line to be allocated into the level one cache 40 (typically the cache line being treated as clean within the level one cache memory 40), whilst at the same time that cache line will be cleaned from the level two cache 50. This will involve invalidating the cache line in the level two cache 50, but also, due to the fact that the cache line is marked as dirty, will involve eviction of that cache line back to main memory 60, thereby introducing significant latency. It should be noted that this eviction takes place irrespective of whether the cache line includes data values that are truly dirty, due to the fact that when the cache line was originally evicted from the level one cache 40 to the level two cache 50, it was marked as dirty in the level 2 cache irrespective of whether its contents had ever been modified by the level one cache 40.

Figure 3:
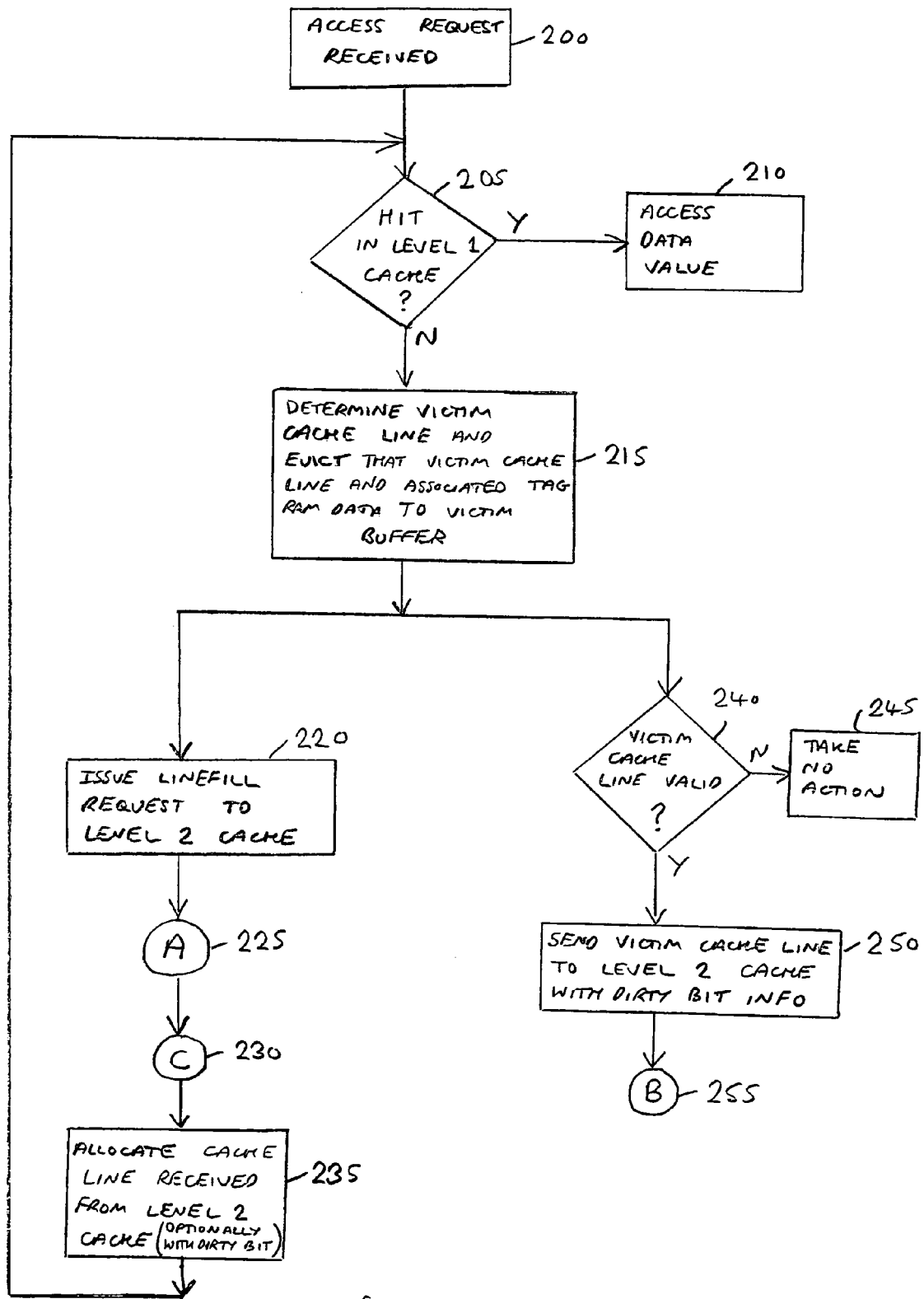
FIGS. 3, 4 and 5 are flow diagrams illustrating processes performed within the level one and level two caches of FIG. 1 to implement eviction and linefill processes in accordance with one embodiment of the present invention.
Figure 4:
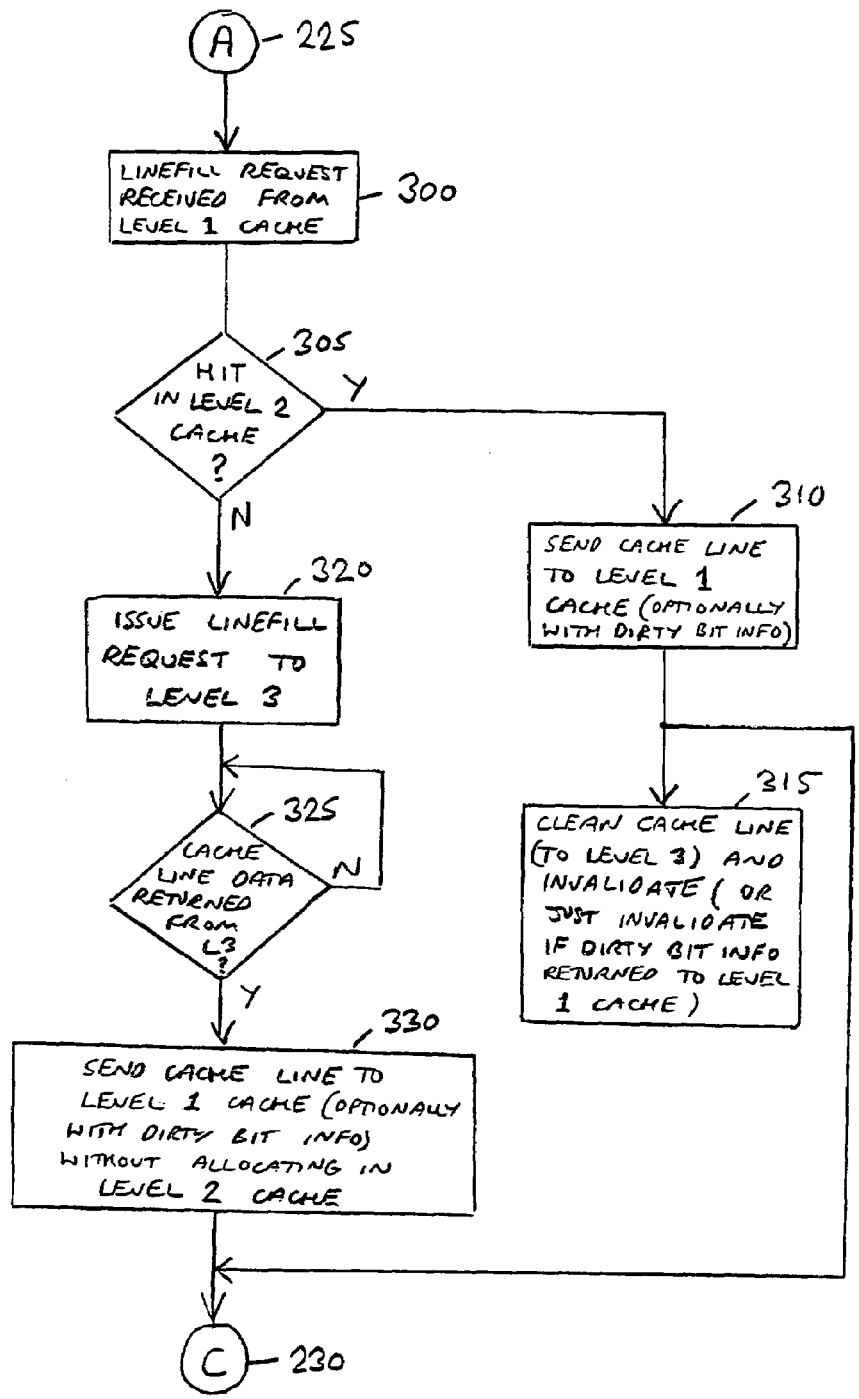
Figure 5:
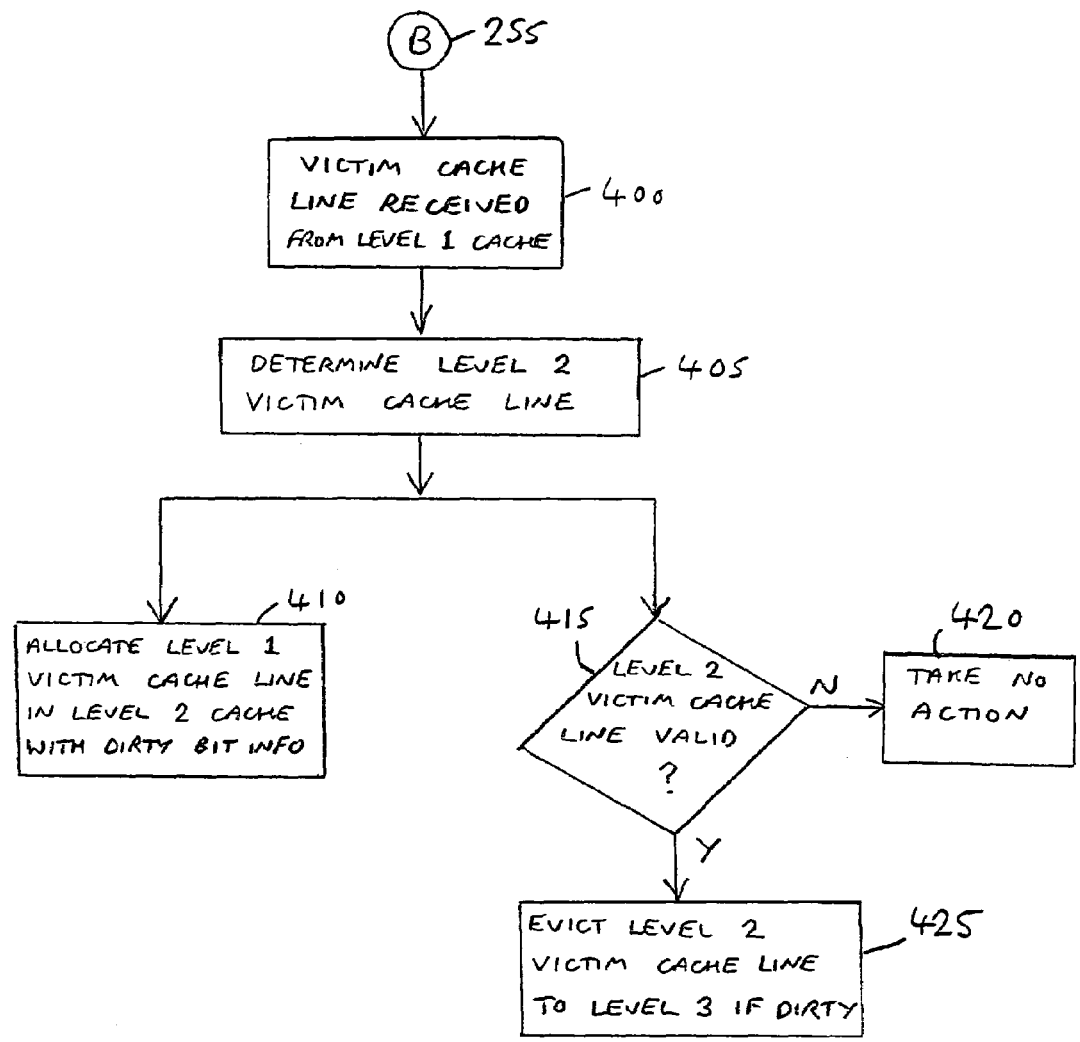

FIGS. 3 to 5 are flow diagrams illustrating processing performed within the level one cache 40 and the level two cache 50 in one embodiment of the present invention with the aim of reducing the number of evictions from the level two cache 50 to main memory 60 when employing exclusive behaviour between the level one cache 40 and the level two cache 50. In particular, FIGS. 3 to 5 consider the processing of access requests that can cause a linefill procedure to take place which is exclusive. Hence, in one particular embodiment, FIGS. 3 to 5 illustrate the process performed when handling exclusive read or write accesses assuming a read allocate and write allocate policy applies, whilst in an alternative embodiment FIGS. 3 to 5 illustrate the processing that would be performed when handling exclusive read accesses assuming only a read allocate policy applies and not a write allocate policy. In this latter situation, write accesses will be handled separately.

At step 200, an access request is received that is of the type that can cause a linefill process which is exclusive to be performed. At step 205, it is then determined whether there is a hit in the level one cache, and if so the data value is accessed directly at step 210 within the level one cache 40. Accordingly, for a write access, the data value can be updated in the level one cache, and the corresponding dirty value set, whilst for a read access the data value is merely read from the level one cache and returned to the CPU 20.

If at step 205 it is determined that there is not a hit in the level one cache, and accordingly a cache miss has occurred, then at step 215 a victim cache line is determined and that victim cache line along with its associated TAG RAM entry is evicted to the victim buffer 30. It will be appreciated that there are a number of policies which can be applied for determining suitable victim cache lines, and any of those policies could be applied here.

The process then branches down two paths which in one embodiment can be performed in parallel. In particular, as shown in FIG. 3, the level one cache 40 is arranged at step 220 to issue a linefill request to the level two cache 50, whereafter a sequence of steps are performed between point A 225 and point C 230 within the level two cache in order to obtain a cache line for returning to the level one cache. This sequence of steps will be described later with reference to FIG. 4. Once the cache line the subject of the linefill request is returned to the level one cache, then at step 235 that cache line is allocated within the level one cache. Optionally, such allocation may involve setting the dirty bit dependent on dirty information returned from the level two cache in association with the cache line. Thereafter, the process returns to step 205.

In parallel with steps 220, 225, 230 and 235, the victim buffer 30 determines at step 240 whether the victim cache line is valid. If not, then no action is required (step 245) whereas otherwise the victim cache line is sent from the victim buffer 30 to the level two cache 50 at step 250, the victim buffer 30 being arranged to also pass to the level two cache the dirty bit information associated with that cache line. The process then reaches point B 255, where a number of steps are performed within the level two cache, these steps being described later with reference to FIG. 5.

FIG. 4 illustrates the steps performed within the level two cache 50 between points 225 and 230 of FIG. 3. Firstly, at step 300, the linefill request is received from the level one cache 40, whereafter at step 305 it is determined whether a hit exists within the level two cache, i.e. whether the cache line the subject of the linefill request is present within the level two cache. If so, then the process branches to step 310, where the cache line is sent to the level one cache 40. In one embodiment, any associated dirty bit information is not passed to the level one cache, and instead the level one cache merely treats the cache line received from the level two cache as being clean, and accordingly does not set the dirty bit. However, in an alternative embodiment, the level two cache is arranged at step 310 to include the dirty bit information when returning the cache line to the level one cache, such that at step 235 in FIG. 3 that dirty bit information can be used to appropriately set the dirty bit associated with that cache line as it is allocated into the level one cache.

Following step 310, the process then branches down two paths which in one embodiment can be performed in parallel. In particular, step 315 is performed within the level two cache whilst within the level one cache, step 235 of FIG. 3 can be performed. More particularly, at step 315, the cache line is cleaned and invalidated in embodiments where the dirty bit information is not transmitted from the level two cache to the level one cache at step 310. Accordingly, in such embodiments, the cache line is marked as invalid in the level two cache, and if that cache line is dirty it is then evicted to level three of the memory system, in the particular embodiment illustrated in FIG. 1 this being the main memory 60.

As will be discussed later with reference to FIG. 5, since at step 250 in FIG. 3 any victim cache line sent to the level two cache from the level one cache also includes the dirty bit information stored within the level one cache, this enables those cache lines when allocated in the level two cache to have associated therewith in the level two cache a dirty bit which truly reflects the dirty/clean status of the data in that cache line. This is in contrast to a typical prior art exclusive approach where any such cache line evicted from the level one cache is always allocated in the level two cache as dirty.

It can be seen that when it comes to performing the cleaning of a cache line at step 315, the approach of embodiments of the present invention can be particularly beneficial in avoiding any unnecessary eviction of the cache line to level three memory, since only if the cache line is truly dirty will it be evicted to level three memory.

In situations where the level two cache is arranged when performing a linefill process to the level one cache to include dirty bit information in the data sent to the level one cache, then step 315 becomes even more efficient, since in that case it is merely necessary to invalidate the cache line in the level two cache, and there is no need to clean the cache line, irrespective of whether that cache line is clean or dirty, since the correct dirty bit status is still retained within the cache hierarchy, in particular being retained within the level one cache when that cache line is allocated in the level one cache. Hence, such an approach further reduces the occurrence of needing to evict cache lines from the level two cache 50 to memory 60.

If at step 305 it is determined that there is no hit in the level two cache, then a linefill request is issued at step 320 to the level three memory, in this instance the main memory 60. This will result at step 325 in the required cache line data being returned from the level three memory 60 at some point, whereafter the process proceeds to step 330, where, in the embodiment illustrated in FIG. 4, the cache line is sent to the level one cache without allocating that cache line in the level two cache. In the embodiment where dirty bit information is transmitted from the level two cache to the level one cache, then such a cache line can include associated dirty bit information, which in this instance will indicate that the cache line is clean (since it has come directly from main memory 60). The process then proceeds to point 230, where as can be seen from the earlier described FIG. 3 the cache line will then be allocated within the level one cache along with any associated dirty bit information.

FIG. 5 illustrates the steps performed within the level two cache when a victim cache line is sent to the level two cache from the level one cache. As discussed earlier with reference to step 250 of FIG. 3, dirty bit information will be associated with that victim cache line when it is transmitted to the level two cache. At step 400, that victim cache line is received by the level two cache from the level one cache, whereafter at step 405 the level two cache determines a victim cache line within the level two cache, i.e. determines a cache line within the level two cache that can be evicted to make space for the victim cache line that has just been received from the level one cache at step 400.

Then the process branches down two paths which in one embodiment can be performed in parallel. In particular, at step 410, the level one victim cache line is allocated in the level two cache and in the associated TAG portion the dirty bit information is stored that has been received from the level one cache, thereby ensuring that the true dirty/clean status of the data is retained within the level two cache. Meanwhile, at step 415, it is determined whether the level two victim cache line determined at step 405 is valid. If not, then at step 420 no action is taken with respect to that victim cache line, whereas if the cache line is valid then at step 425 that level two victim cache line is evicted to level three memory if that cache line is dirty. The level 2 victim cache line is also at this point invalidated within the level 2 cache.

It should be noted that if step 315 of FIG. 4 has been performed prior to step 405 of FIG. 5 taking place, then when determining a level two victim cache line at step 405 there will always be at least one invalid line within the level two cache that can be selected as a victim cache line. Accordingly, at step 415 it will be determined that the victim cache line is not valid, and accordingly no action will be required. Accordingly, step 425 will only typically be invoked if a victim cache line has to be determined at step 405 at a point when step 315 of FIG. 4 has not yet completed.

FIG. 6 is a diagram illustrating the construction of the level one cache 40 and level two cache 50 in accordance with one embodiment. More particularly, the level one cache of one embodiment consists of a separate data cache 500 and instruction cache 510. In contrast, in this embodiment the level two cache is a unified cache for storing both data and instructions. In such embodiments, the level one cache 40 and the level two cache 50 can be arranged to operate exclusively for at least some data accesses, and hence cache lines will typically be passed in both directions between the data cache 500 of the level one cache 40 and the unified level two cache 50, as indicated by paths 502, 504 in FIG. 6.

In contrast, in such embodiments, for any instructions the level one cache and the level two cache are arranged to operate in an inclusive manner, and accordingly the instruction cache 510 is arranged to contain a subset of the instructions stored within the level two cache 50. Further, instructions are never overwritten within the instruction cache 510 and accordingly no dirty bit information is stored within the instruction cache 510. The result of this is that typically there is no need to output instruction cache lines from the instruction cache 510 to the level two cache 50, and instead victim cache lines in the instruction cache 510 can merely be invalidated in order to make space for new instruction cache lines to be routed from the level two cache 50 to the instruction cache 510 over path 514. Hence, the path 512 is typically not required. However, in alternative embodiments, the instruction cache 510 and the unified level two cache 50 may be arranged to operate exclusively in some situations, and in that instance a path 512 may be provided.

In accordance with one embodiment, when data cache lines are evicted from the data cache 500 to the level two cache 50 over path 502, the associated dirty bit information is always transmitted to the level two cache so that when that cache line is allocated in the level two cache the associated dirty bit information is also stored. This ensures that lines that are in fact clean in the data cache 500 at the time they are evicted can be retained as clean within the level two cache 50, hence avoiding the need to evict those cache lines to main memory if those cache lines are subsequently returned to the data cache 500.

If separate ports are provided in the unified level two cache 50 for the transfer of data to the data cache 500 and instructions to the instruction cache 510, i.e. the paths 504, 514 are initiated at different ports, then it is also possible to employ the additional feature of transferring dirty bit information from the level two cache 50 to the data cache 500 when cache lines the subject of exclusive behaviour are passed to the data cache 500 from the level two cache 50 as part of a linefill process. However, in the absence of such separate ports, it will typically be the case that dirty bit information will not be transmitted from the level two cache to the level one cache, due to the fact that such dirty bit information is not typically used by the instruction cache 510.

Whilst the techniques of embodiments of the present invention may be used in a uni-processor system, they may also be usefully employed in a data processing apparatus having multiple processors. One such example system is illustrated in FIG. 7, where a symmetric multi-processing (SMP) system 560 is illustrated. The SMP system 560 illustrated in FIG. 7 has four cores 520, 525, 530, 535, each of which has associated therewith its own level one cache 522, 527, 532, 537, respectively. These level one caches communicate via a Snoop Control Unit (SCU) 540 with the unified level two cache 550. The SCU 540 serves to provide a consistent view of level one cache to the level two cache 550, and also manages the various level one caches 522, 527, 532, 537 to ensure that their contents remain consistent with each other. For example, if one level one cache updates a particular data value in a cache line, causing that cache line to be marked as dirty, then the SCU 540 ensures that any of the other level one caches that also include a copy of that data will see the updated data. In one particular embodiment, any of the other level one caches that include a copy of that data will invalidate that data, and the SCU ensures that only one level one cache at a time can hold a dirty cache line containing the updated data value.

As with the earlier described embodiment, whenever a cache line is evicted from a level one cache, the associated dirty bit is also transferred to the level two cache 550 so that within the level two cache that cache line can be allocated with a dirty bit which correctly reflects the clean/dirty nature of the cache line. When exhibiting exclusive behaviour between the level two cache 550 and the level one cache as embodied by the four separate level one caches 522, 527, 532, 537, when any cache line is evicted from a particular level one cache to the level two cache, the SCU 540 will ensure that any of the other level one caches that had a copy of that cache line mark that cache line as invalid.

From the above described embodiments of the present invention, it will be appreciated that by arranging that on an eviction of a cache line from the level one cache to the level two cache when employing exclusive behaviour, the associated dirty bit is also additionally passed to the level two cache, this can significantly reduce the number of evictions of cache lines taking place from the level two cache to main memory. In a further embodiment, the additional transfer of dirty bits from the level two cache to the level one cache when a linefill procedure is performed further reduces the number of evictions required from the level two cache. Accordingly, embodiments of the present invention enable the benefits of exclusive cache behaviour to be realised, namely an effective increase in the size of the cache represented by the cache hierarchy, whilst reducing the occurrence of evictions from the cache hierarchy to main memory.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
a processing unit operable to issue an access request seeking access to a data value;
a hierarchy of cache memories operable to store data values for access by the processing unit, the hierarchy of cache memories comprising at least an n-th level cache memory and an n+1-th level cache memory which at least in part employ exclusive behaviour with respect to each other;
each cache memory comprising a plurality of cache lines, at least one dirty value being associated with each cache line, each dirty value being settable to indicate that at least one data value held in the associated cache line is more up-to-date than a corresponding data value stored in a main memory;
when employing exclusive behaviour the n-th level cache memory being operable, on eviction of a cache line from the n-th level cache memory to the n+1-th level cache memory, to additionally pass an indication of the at least one associated dirty value from the n-th level cache memory to the n+1-th level cache memory, for use in selecting the at least one dirty value associated with the cache line in the n+1-th level cache memory that is to store the data values of the cache line evicted from the n-th level cache memory thereby facilitating a reduction in evictions from the n+1-th level cache memory.

2. A data processing apparatus as claimed in claim 1, wherein when employing exclusive behaviour the n+1-th level cache memory is operable, on performing a linefill operation from the n+1-th level cache memory to the n-th level cache memory, to additionally pass an indication of the at least one associated dirty value from the n+1-th level cache memory to the n-th level cache memory.

3. A data processing apparatus as claimed in claim 1, wherein the n-th level cache memory is a level 1 cache memory and the n+1-th level cache memory is a level 2 cache memory.

4. A data processing apparatus as claimed in claim 3, wherein the processing unit is a processor core.

5. A data processing apparatus as claimed in claim 3, wherein said processing unit comprises a plurality of processors, and said level 1 cache memory comprises a plurality of caches, each cache being associated with one of said plurality of processors.

6. A data processing apparatus as claimed in claim 1, wherein the n-th level cache memory and the n+1-th level cache memory are operable to selectively employ inclusive behaviour or said exclusive behaviour dependent on one or more control parameters.

7. A data processing apparatus as claimed in claim 1, wherein said n-th level cache memory and said n+1-th level cache memory comprise data cache memories.

8. A data processing apparatus as claimed in claim 7, further comprising an n-th level instruction cache memory and an n+1-th level instruction cache memory which employ inclusive behaviour with respect to each other.

9. A data processing apparatus comprising:
processing means for issuing an access request seeking access to a data value;
a hierarchy of cache memory means for storing data values for access by the processing unit, the hierarchy of cache memory means comprising at least an n-th level cache memory means and an n+1-th level cache memory means which at least in part employ exclusive behaviour with respect to each other;
each cache memory means comprising a plurality of cache lines, at least one dirty value being associated with each cache line, each dirty value being settable to indicate that at least one data value held in the associated cache line is more up-to-date than a corresponding data value stored in a main memory;
when employing exclusive behaviour, the n-th level cache memory means being arranged, on eviction of a cache line from the n-th level cache memory means to the n+1-th level cache memory means, to additionally pass an indication of the at least one associated dirty value from the n-th level cache memory means to the n+1-th level cache memory means, for use in selecting the at least one dirty value associated with the cache line in the n+1-th level cache memory means that is to store the data values of the cache line evicted from the n-th level cache memory means thereby facilitating a reduction in evictions from the n+1-th level cache memory means.

10. A method of managing cache memories in a data processing apparatus, the data processing apparatus having a processing unit for issuing an access request seeking access to a data value, and a hierarchy of cache memories for storing data values for access by the processing unit, each cache memory in the hierarchy comprising a plurality of cache lines, at least one dirty value being associated with each cache line, each dirty value being settable to indicate that at least one data value held in the associated cache line is more up-to-date than a corresponding data value stored in a main memory, the method comprising the steps of:

arranging the hierarchy of cache memories such that at least an n-th level cache memory and an n+1-th level cache memory at least in part employ exclusive behaviour with respect to each other;

when employing exclusive behaviour causing the n-th level cache memory, on eviction of a cache line from the n-th level cache memory to the n+1-th level cache memory, to additionally pass an indication of the at least one associated dirty value from the n-th level cache memory to the n+1-th level cache memory, for use in selecting the at least one dirty value associated with the cache line in the n+1-th level cache memory that is to store the data values of the cache line evicted from the n-th level cache memory thereby facilitating a reduction in evictions from the n+1-th level cache memory.

* * * * *